(12) United States Patent
Kim

(10) Patent No.: US 8,508,626 B2
(45) Date of Patent: Aug. 13, 2013

(54) APPARATUS FOR DIGITAL MOVING PICTURE PHOTOGRAPHING OR PROCESSING

(75) Inventor: Myeong-ho Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 272 days.

(21) Appl. No.: 12/690,237

(22) Filed: Jan. 20, 2010

(65) Prior Publication Data

US 2010/0208103 A1    Aug. 19, 2010

(30) Foreign Application Priority Data

Feb. 13, 2009   (KR) .................... 10-2009-0012124

(51) Int. Cl.
- *H04N 5/272* (2006.01)
- *H04N 5/772* (2006.01)
- *G08B 6/00* (2006.01)

(52) U.S. Cl.
USPC .............. 348/239; 348/231.4; 340/407.1

(58) Field of Classification Search
USPC .............. 348/208.4, 205, 154–155, 208.1, 348/208.2, 208.5, 208.13, 241, 352; 396/310, 396/52, 105, 153, 312, 657
See application file for complete search history.

(56) References Cited

U.S. PATENT DOCUMENTS

| | | | |
|---|---|---|---|
| 4,984,087 A * | 1/1991 | Fujimura et al. ............... | 348/348 |
| 5,684,722 A * | 11/1997 | Thorner et al. .................... | 703/3 |
| 5,857,986 A * | 1/1999 | Moriyasu ........................ | 601/49 |
| 5,954,581 A * | 9/1999 | Ohta et al. ........................ | 463/9 |
| 2004/0023718 A1* | 2/2004 | Kondo et al. .................... | 463/30 |
| 2004/0092308 A1* | 5/2004 | Lim et al. ........................ | 463/30 |
| 2006/0164522 A1* | 7/2006 | Komori ...................... | 348/231.99 |
| 2006/0192857 A1* | 8/2006 | Kondo et al. .............. | 348/208.4 |
| 2007/0291114 A1* | 12/2007 | Oshima ......................... | 348/126 |
| 2008/0055419 A1* | 3/2008 | Ito ............................ | 348/207.99 |
| 2009/0167701 A1* | 7/2009 | Ronkainen ..................... | 345/173 |
| 2009/0251421 A1* | 10/2009 | Bloebaum ...................... | 345/173 |
| 2011/0141296 A1* | 6/2011 | Yumiki ...................... | 348/208.4 |

FOREIGN PATENT DOCUMENTS

| | | |
|---|---|---|
| JP | 08-111838 A | 4/1996 |
| JP | 10-290405 A | 10/1998 |
| JP | 2007-036360 A | 2/2007 |
| KR | 1020040052527 A | 6/2004 |
| KR | 1020050070503 A | 7/2005 |
| KR | 10-585678 B1 | 5/2006 |

* cited by examiner

*Primary Examiner* — Roberto Velez
*Assistant Examiner* — Stephen Coleman
(74) *Attorney, Agent, or Firm* — Drinker Biddle & Reath LLP

(57) ABSTRACT

A digital moving picture photographing apparatus and processing apparatus may generate vibration data when shooting a moving picture or may induce vibrations when displaying the moving picture. The digital moving picture photographing apparatus may include an image capture device that generates image data from incident light, a motion vector acquisition unit that acquires a motion vector based on the image data, a sound data generation unit that generates sound data from incident sound waves, a vibration data generation unit that generates vibration data based on the sound data or the motion vector, a storage medium that stores a moving picture file including at least one of the sound data and the vibration data along with the image data, a vibration unit that induces vibrations corresponding to the moving picture file, and a display unit that displays an image corresponding to the image data or the moving picture file.

13 Claims, 8 Drawing Sheets

APPARATUS FOR DIGITAL MOVING PICTURE PHOTOGRAPHING OR PROCESSING

CROSS-REFERENCE TO RELATED PATENT APPLICATION

This application claims the priority benefit of Korean Patent Application No. 10-2009-0012124, filed on Feb. 13, 2009, in the Korean Intellectual Property Office, the disclosure of which is incorporated herein in its entirety by reference.

BACKGROUND

1. Field of the Invention

The present invention generally relates to an apparatus for digital moving picture photographing or processing, and more particularly, to an apparatus for digital moving picture photographing or processing that may generate vibration data when shooting a moving picture or may induce vibrations when displaying the moving picture.

2. Description of the Related Art

Typically, digital moving picture photographing apparatuses store a moving picture file, obtained by shooting in a shooting mode, in a storage medium and/or display a moving picture corresponding to the moving picture file stored in the storage medium. In addition, digital moving picture processing apparatuses typically display frame images from a moving picture file stored in a storage medium on a display unit.

In such a conventional digital photographing apparatus, moving picture files including image data and sound data are typically stored in the storage medium when shooting. However, when a moving picture file acquired using a conventional digital moving picture photographing apparatus is reproduced using a conventional digital moving picture photographing apparatus or digital moving picture processing apparatus, nothing more is presented than images corresponding to the image data displayed on the display unit and sounds corresponding to the sound data output through a speaker. Thus, a user watching the moving picture does not enjoy a dynamic, engaging experience. In particular, when the user watches the moving picture using a portable digital moving picture processing apparatus, the user enjoys an even less dynamic experience since a display unit of the portable digital moving picture processing apparatus displaying the moving picture may be small and the volume of speakers in the portable digital moving picture processing apparatus may be low.

SUMMARY

A digital moving picture photographing apparatus and a digital moving picture processing apparatus may generate vibration data when shooting a moving picture or may induce vibrations when displaying the moving picture.

In an embodiment, a digital moving picture photographing apparatus comprises an image capture device that generates image data from incident light, a sound data generation unit that generates sound data from incident sound waves, a vibration data generation unit that generates vibration data corresponding to the sound data generated by the sound data generation unit, a storage medium that stores a moving picture file including at least one of the sound data generated by the sound data generation unit and the vibration data generated by the vibration data generation unit along with the image data generated by the image capture device, and a display unit that displays an image corresponding to the image data generated by the image capture device or frame images corresponding to the moving picture file stored in the storage medium.

The digital moving picture photographing apparatus may further comprise a vibration unit that vibrates the digital moving picture photographing apparatus. When the frame images corresponding to the moving picture file stored in the storage medium are displayed on the display unit, the vibration unit may vibrate the digital moving picture photographing apparatus according to the vibration data included in the moving picture file.

The vibration data generation unit may generate vibration data having magnitudes corresponding to sound intensities of the sound data generated by the sound data generation unit.

When sound intensities are divided into a plurality of sound intensity sections, the vibration data generation unit may generate vibration data having magnitudes that correspond to the sound intensities of a sound intensity section to which sounds corresponding to the sound data generated by the sound data generation unit belong.

In another embodiment, a digital moving picture photographing apparatus comprises an image capture device that generates image data from incident light, a motion vector acquisition unit that acquires a motion vector based on the image data generated by the image capture device, a vibration data generation unit that generates vibration data based on the motion vector acquired by the motion vector acquisition unit, a storage medium that stores a moving picture file including the image data generated by the image capture device and optionally also the vibration data generated by the vibration data generation unit, and a display unit that displays an image corresponding to the image data generated by the image capture device or frame images corresponding to the moving picture file stored in the storage medium.

The digital moving picture photographing apparatus may further comprise a vibration unit that vibrates the digital moving picture photographing apparatus. When the frame images corresponding to the moving picture file stored in the storage medium are displayed on the display unit, the vibration unit may vibrate the digital moving picture photographing apparatus according to the vibration data included in the moving picture file.

The vibration data generation unit may generate vibration data having a magnitude corresponding to a magnitude of the motion vector acquired by the motion vector acquisition unit.

When magnitudes of the motion vector are divided into a plurality of magnitude sections, the vibration data generation unit may generate vibration data having magnitudes that correspond to magnitudes of a magnitude section to which the magnitudes of the motion vector acquired by the motion vector acquisition unit belong.

The motion vector acquisition unit may acquire the motion vector according to a location of a main object during shooting using the digital moving picture photographing apparatus.

The motion vector acquisition unit may acquire the motion vector according to a location of a target part of an object to be auto-focused during shooting using the digital moving picture photographing apparatus.

In an embodiment, a digital moving picture processing apparatus comprises a storage medium that stores a moving picture file, a display unit that displays frame images corresponding to the moving picture file stored in the storage medium, and a vibration unit that induces vibrations having varying magnitudes. When the frame images corresponding to the moving picture file stored in the storage medium are displayed on the display unit, the vibration unit may induce vibrations having magnitudes that correspond to the moving picture file.

The vibration unit may induce vibrations having magnitudes that correspond to sound data included in the moving picture file.

The vibration unit may induce vibrations having magnitudes that correspond to sound intensities of the sound data included in the moving picture file.

When sound intensities are divided into a plurality of sound intensity sections, the vibration unit may induce vibrations having magnitudes that correspond to a sound intensity section to which sounds of the sound data belong.

The vibration unit may induce vibrations according to vibration data included in the moving picture file.

In another embodiment, a digital moving picture processing apparatus comprises a storage medium that stores a moving picture file, a motion vector acquisition unit that acquires a motion vector based on image data included in the moving picture file, a display unit that displays frame images corresponding to the image data included in the moving picture file stored in the storage medium, and a vibration unit that induces vibrations having varying magnitudes. When the frame images are displayed on the display unit, the vibration unit may induce vibrations having magnitudes that correspond to magnitudes of the motion vector acquired by the motion vector acquisition unit.

The vibration unit may induce vibrations having magnitudes that correspond to magnitudes of the motion vector acquired by the motion vector acquisition unit.

When the magnitudes of the motion vector are divided into a plurality of magnitude sections, the vibration unit may induce vibrations having magnitudes that correspond to a magnitude section to which the magnitudes of the motion vector acquired by the motion vector acquisition unit belong.

The motion vector acquisition unit may acquire the motion vector according to the location of a main object.

DETAILED DESCRIPTION

Figure 1:
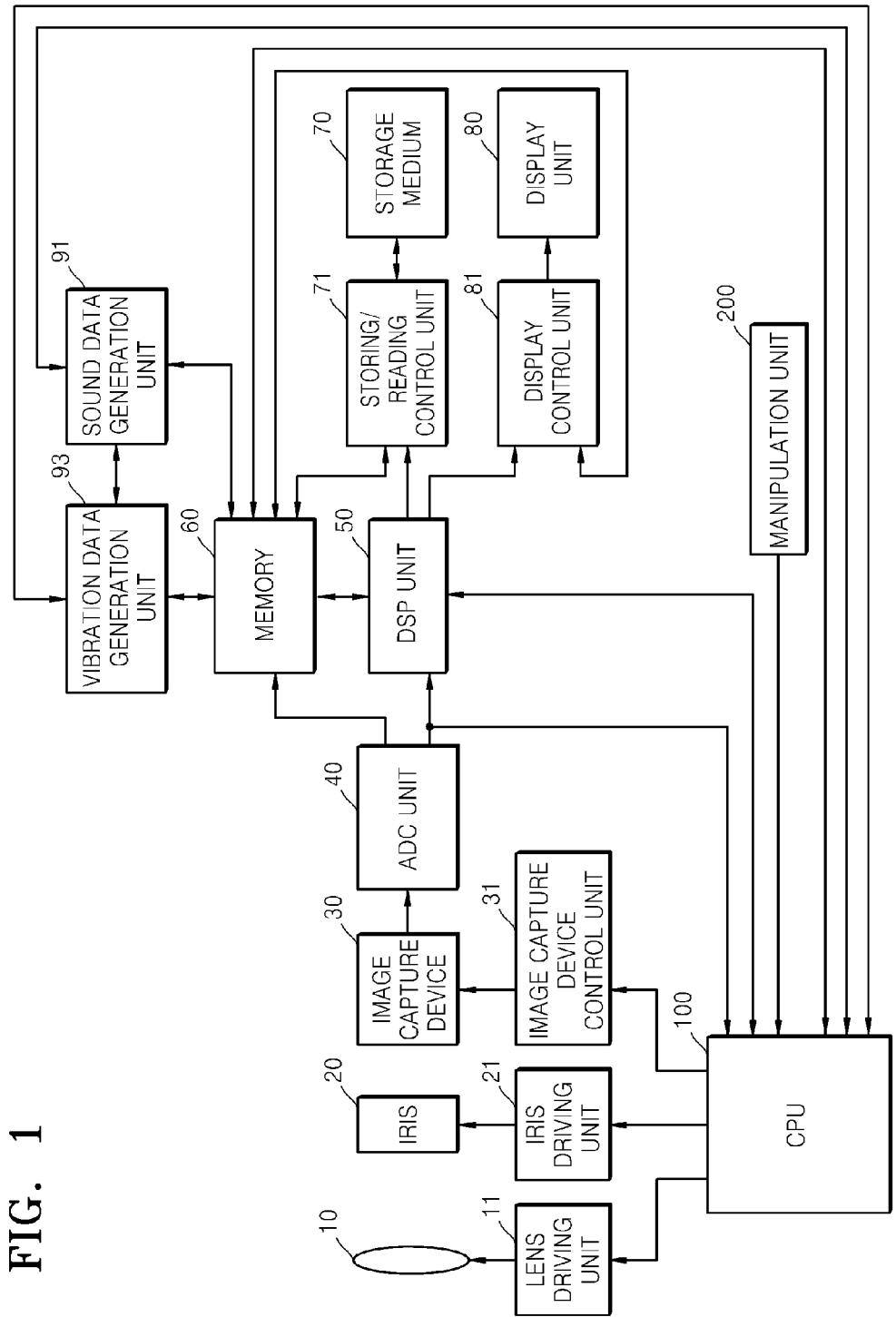
FIG. 1 is a schematic block diagram of an exemplary digital moving picture photographing apparatus.

FIG. 1 is a schematic block diagram of an exemplary digital moving photographing apparatus. All operations of the digital moving picture photographing apparatus may be controlled by a central processing unit (CPU) 100. The digital moving picture photographing apparatus may include a manipulation unit 200 having a key which generates an electrical signal in response to a user's instruction. The electrical signal generated by the manipulation unit 200 may be transmitted to the CPU 100 so that the CPU 100 can control the digital moving picture photographing apparatus according to the electrical signal.

In a shooting mode, as an electrical signal generated in response to a user's instruction is input to the CPU 100, the CPU 100 may analyze the electrical signal and in response thereto, control a lens driving unit 11, an iris driving unit 21, and an image capture device control unit 31. The lens driving unit 11 may control a focus by controlling a position of a lens 10 according to a control signal received from the CPU 100. The lens 10 may allow image light of an object to be photographed to pass therethrough and focus the image light onto an image capture device 30. The iris driving unit 21 may control a degree of openness of an iris 20 according to a control signal received from the CPU 100. The iris 20 may control an amount of light from the lens 10 which passes through to the image capture device 30. The image capture device control unit 31 may control a sensitivity of the image capture device 30 in response to a control signal received from the CPU 100.

The image capture device 30 may generate image data from incident light, e.g. the image light focused onto the image capture device 30 by the lens 10 through the iris 20. An optional analog/digital (A/D) converting unit (ADC) 40 may convert analog image data output from the image capture device 30 into digital image data. The ADC 40 may or may not be included in the digital moving picture photographing apparatus depending on the characteristics of the image capture device 30.

The image data output from the image capture device 30 and/or the ADC unit 40 may be provided to a digital signal processing (DSP) unit 50 via a memory 60 or may be provided directly, bypassing the memory 60. The image data may also be provided to the CPU 100. The memory 60 may include a read-only memory (ROM) and/or a random access memory (RAM). The DSP unit 50 may perform digital signal processing, such as gamma correction, white balance correction, and the like.

Image data output from the DSP unit 50 may be transmitted to a display control unit 81 via the memory 60 or may be transmitted directly to the display control unit 81. The display control unit 81 may control a display unit 80 in order to display an image on the display unit 80. In addition, the image data output from the DSP unit 50 may be input to a storing/reading control unit 71 directly or via the memory 60, and the storing/reading control unit 71 may store the image data in a storage medium 70 in response to a signal received from the user or may store the image data automatically. Alternatively, the storing/reading control unit 71 may read image data from a moving picture file stored in the storage medium 70, and may then provide the read image data to the display control unit 81 via the memory 60 or via another path so that an image is displayed on the display unit 80. The storage medium 70 may be attachable to and detachable from the digital moving picture photographing apparatus. Alternatively, the storage medium 70 may be permanently built in the digital moving picture photographing apparatus.

A sound data generation unit 91 may generate sound data from incident sound waves. The sound data generated by the sound data generation unit 91 may be transmitted to a vibration data generation unit 93. Then, the vibration data generation unit 93 may generate vibration data corresponding to the sound data generated by the sound data generation unit 91. Description of a method in which the vibration data generation unit 93 generates vibration data and descriptions of the vibration data generated by the vibration data generation unit 93 are provided in detail elsewhere herein. The sound data generated by the sound data generation unit 91 and/or the vibration data generated by the vibration data generation unit 93 may be input to the storing/reading control unit 71 via the memory 60 or may be input directly (not illustrated in FIG. 1). The storing/reading control unit 71 may store, in addition to the image data received from the DSP unit 50 and/or the memory 60, at least one of the sound data generated by the sound data generation unit 91 and the vibration data generated by the vibration data generation unit 93 in the storage medium 70 automatically or in response to a signal received from the user. In other words, the storage medium 70 may store a moving picture file including at least one of the sound data generated by the sound data generation unit 91 and the vibration data generated by the vibration data generation unit 93, along with the image data generated by the image capture device 30.

Figure 2:
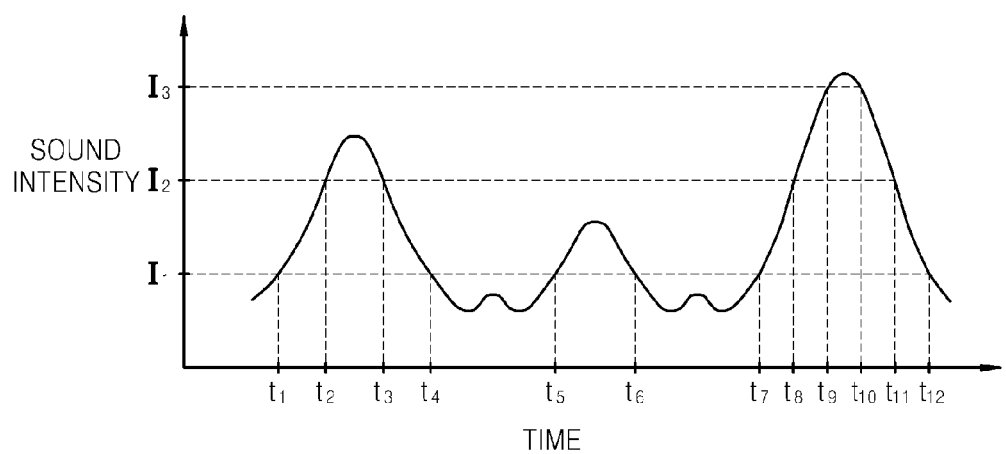
FIG. 2 is a schematic graph of sound intensity with respect to time, wherein the sound intensity corresponds to sound data generated by a sound data generation unit of the digital moving picture photographing apparatus in FIG. 1.
Figure 3:
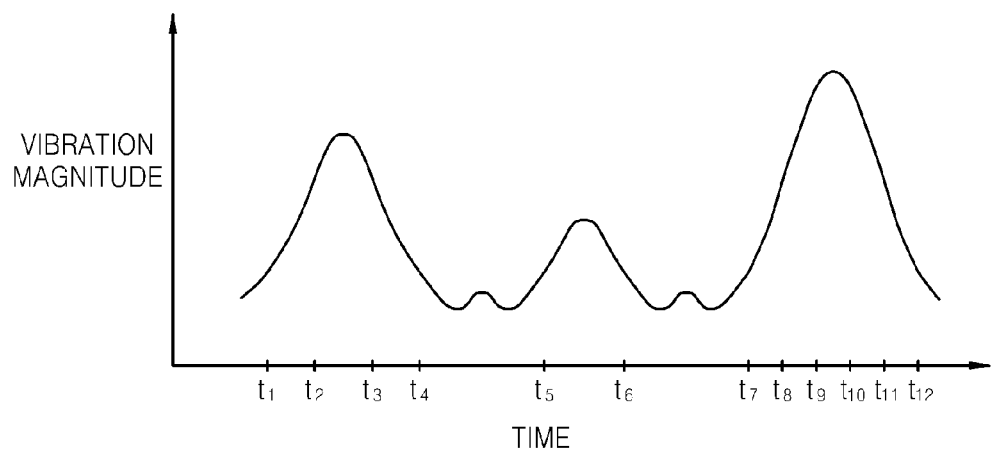
FIG. 3 is a schematic graph of vibration magnitude with respect to time, wherein the vibration magnitude corresponds to vibration data generated by a vibration data generation unit of the digital moving picture photographing apparatus in FIG. 1.

FIG. 2 is a schematic graph of sound intensity with respect to time, wherein the sound intensity corresponds to the sound data generated by the sound data generation unit 91 of the digital moving picture photographing apparatus in FIG. 1. The sound data generation unit 91, which may include, for example, a kind of microphone, may generate the sound data by detecting sounds when shooting a moving picture. Such sounds may vary with time, and thus, sound intensities of the sound data generated by the sound data generation unit 91 may vary with time, as shown in FIG. 2. Then, the vibration data generation unit 93 may generate vibration data corresponding to the sound data generated by the sound data generation unit 91. For example, the vibration data generation unit 93 may generate vibration data whose magnitude varies with time, as shown in FIG. 3. FIG. 3 is a schematic graph of vibration magnitude with respect to time, wherein the vibration magnitude corresponds to vibration data generated by the vibration data generation unit 93. FIG. 3 shows that the vibration data generated by the vibration data generation unit 93 may have magnitudes corresponding to the sound intensities of the sound data generated by the sound data generation unit 91.

The moving picture file stored in the storage medium 70 of the digital moving picture photographing apparatus may further include the vibration data generated by the vibration data generation unit 93, in addition to the image data generated by the image capture device 30 and the sound data generated by the sound data generation unit 91, according to a user's selection. When such a moving picture file is reproduced using a digital moving picture processing apparatus including a vibration unit with a vibration function, the vibration unit may induce vibrations according to the vibration data generated by the vibration data generation unit 93 while images corresponding to the image data are displayed and sounds corresponding to the sound data are emitted through a speaker. Thus, the user may feel the vibrations while viewing the images and listening to the sounds. As a result, unlike when viewing the images while listening to sounds without any vibrations, the user may experience the moving picture to be more dynamic and engaging. In particular, since the vibration data generation unit 93 may generate vibration data based on the sound data generated by the sound data generation unit 91, vibrations may become large when the sound intensity is high and may become small when the sound intensity is low, and the user may feel vibrations fit to the mood of the moving picture file.

Figure 4:
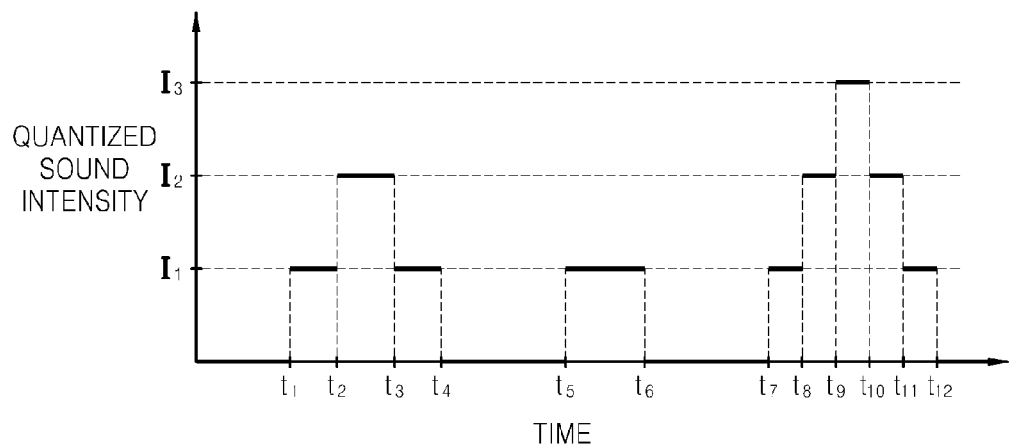
FIG. 4 is a schematic graph of quantized sound intensity with respect to time, wherein the quantized sound intensity corresponds to sound data generated by the sound data generation unit of the digital moving picture photographing apparatus in FIG. 1.

The vibration data generation unit 93 of the digital moving picture photographing apparatus may generate vibration data in a manner different from that described with reference to FIG. 3. For example, when the sound data generation unit 91 generates sound data as shown in FIG. 2, the sound data may be quantized, as shown in FIG. 4. In other words, referring to FIGS. 2 and 4, the sound intensity may be quantized to 0 if the sound intensity is smaller than $I_1$, the sound intensity may be quantized to $I_1$ if the sound intensity is greater than $I_1$ and smaller than $I_2$, the sound intensity may be quantized to $I_2$ if the sound intensity is greater than $I_2$ and smaller than $I_3$, and the sound intensity may be quantized to $I_3$ if the sound intensity is greater than $I_3$. Thus, the quantized sound intensity may be 0 up to time $t_1$, the quantized sound intensity may be $I_1$ between time $t_1$ and time $t_2$, and the quantized sound intensity may be $I_2$ between time $t_2$ and time $t_3$.

Figure 5:
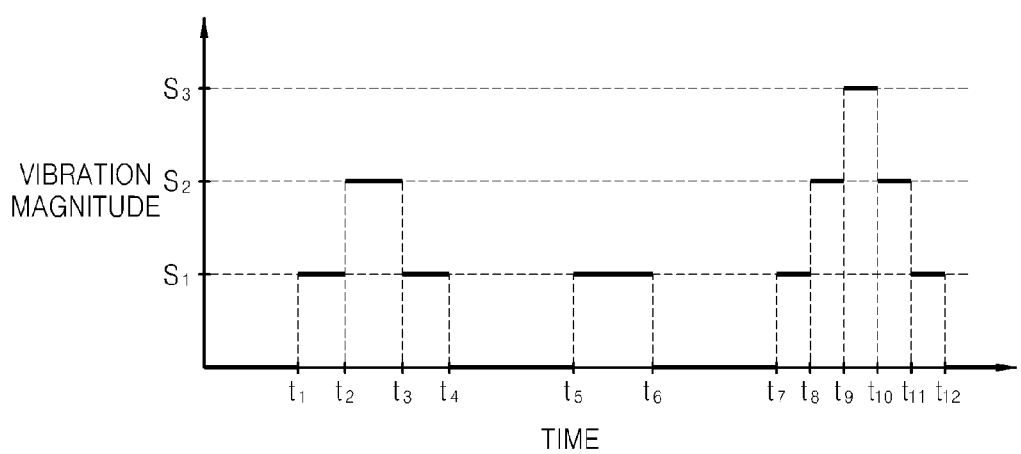
FIG. 5 is a schematic graph of vibration magnitude with respect to time, wherein the vibration magnitude corresponds to vibration data generated by the vibration data generation unit of the digital moving picture photographing apparatus in FIG. 1.

FIG. 5 is a schematic graph of vibration magnitude with respect to time, wherein the vibration magnitude corresponds to vibration data generated by the vibration data generation unit 93. The vibration data generation unit 93 may generate vibration data having magnitudes that correspond to the quantized sound intensities of FIG. 4. In other words, the vibration data generation unit 93 may generate vibration data having a magnitude of 0 up to time $t_1$, vibration data having a magnitude of $S_1$ between time $t_1$ and time $t_2$, and vibration data having a magnitude of $S_2$ between time $t_2$ and time $t_3$, as shown in FIG. 5.

When sound intensities are divided into a plurality of sound intensity sections, as illustrated in FIG. 4, the vibration data generation unit 93 may generate vibration data having magnitudes that correspond to the sound intensities of a sound intensity section to which sounds corresponding to the sound data generated by the sound data generation unit 91 belong. For example, in the case where the vibration data generation unit 93 generates vibration data as shown in FIG. 3 and stores the vibration data along with a moving picture file in the storage medium 70, when the moving picture file is reproduced, the digital moving picture processing apparatus may vibrate constantly at varying magnitudes if the moving picture file includes sound. The constant vibration may annoy the user. However, in the case where the vibration data generation unit 93 generates vibration data as shown in FIG. 5 and stores the vibration data along with a moving picture file in the storage medium 70, when the moving picture file is reproduced, the digital moving picture processing apparatus may induce vibrations only in a predetermined sound intensity section, (e.g., between $I_1$ and $I_2$) so that the user feels more comfortable compared to when the digital moving picture processing apparatus vibrates constantly.

Although not illustrated, the digital moving picture photographing apparatus in FIG. 1 may further include a vibration unit that vibrates the digital moving picture photographing apparatus. Thus, when frame images corresponding to the moving picture file stored in the storage medium 70 are displayed on the display unit 80, the vibration unit may be controlled to vibrate the digital moving picture photographing apparatus according to the vibration data included in the moving picture file.

Figure 6:
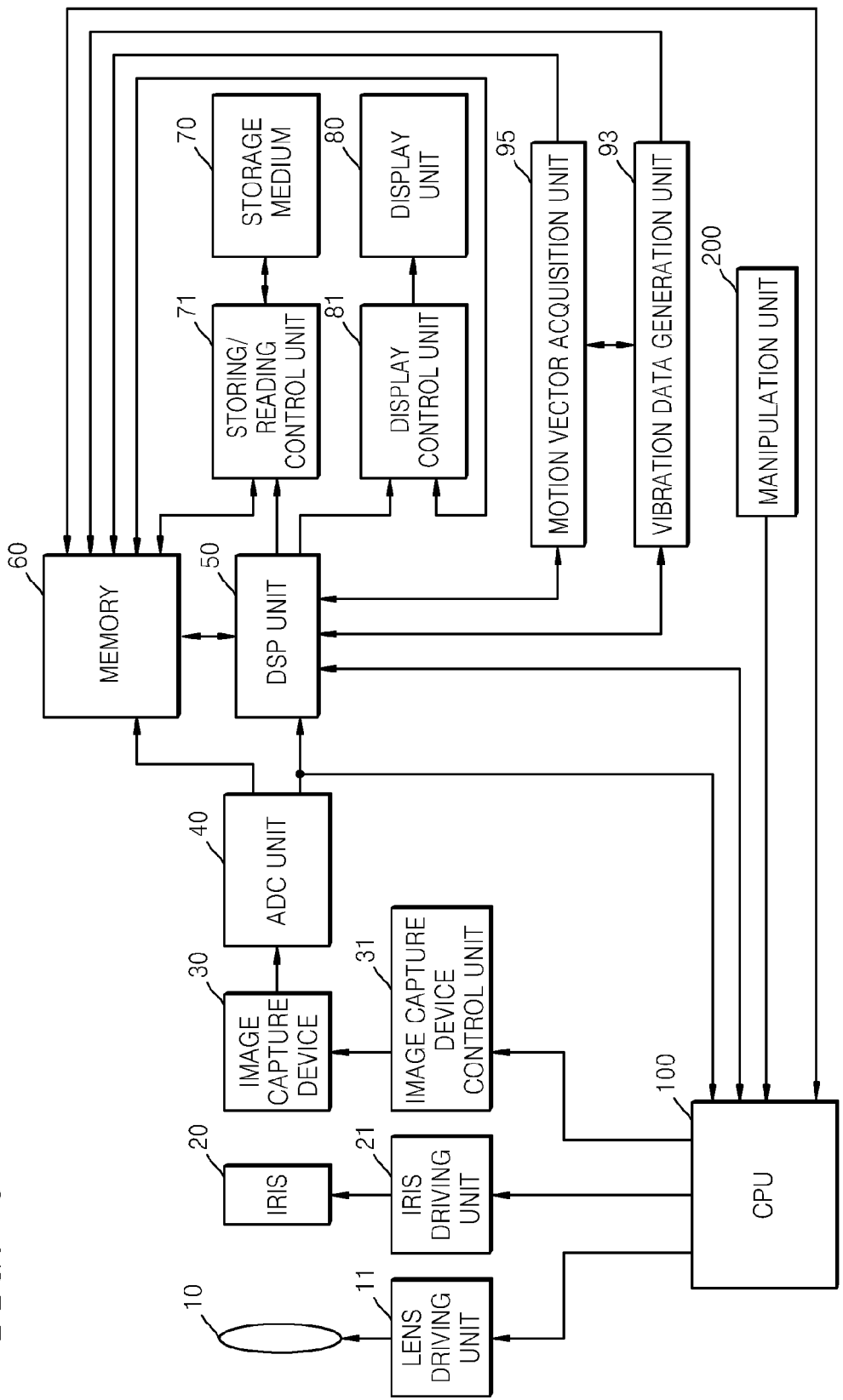
FIG. 6 is a schematic block diagram of another exemplary digital moving picture photographing apparatus.

FIG. 6 is a schematic block diagram of another exemplary digital moving picture photographing apparatus. The digital moving picture photographing apparatus illustrated in FIG. 6 differs from the digital moving picture photographing apparatus described with reference to FIG. 1 in that a motion vector acquisition unit 95 is further included that may acquire a motion vector based on the image data generated by the image capture device 30, and in that the vibration data generation unit 93 may then generate vibration data corresponding to the motion vector acquired by the motion vector acquisition unit 95. In other words, the vibration data generation unit 93 of the digital moving picture photographing apparatus illustrated in FIG. 6 may generate the vibration data based on a motion vector rather than sound data.

Currently available digital moving picture photographing apparatuses may have a face recognition function and may further have a target object tracking function. In shooting using these functions, when the location of a face in a frame image varies or a target object moves, the motion vector acquisition unit 95 may acquire a motion vector corresponding to the variation or movement. For example, the motion vector acquisition unit 95 may acquire a motion vector according to the location of a target part of an object (e.g., a face) to be auto-focused during shooting using the digital moving picture photographing apparatus. Alternatively, the motion vector acquisition unit 95 may acquire a motion vector according to the location of a main object during shooting using the digital moving picture photographing apparatus. A magnitude of the motion vector acquired by the motion vector acquisition unit 95 being large may indicate that the movement of the object in the image is large and the image is mostly dynamic. Thus, when the magnitude of the motion vector is large, the vibration data generation unit 93 may generate vibration data based on the motion vector acquired by the motion vector acquisition unit 95.

Figure 7:
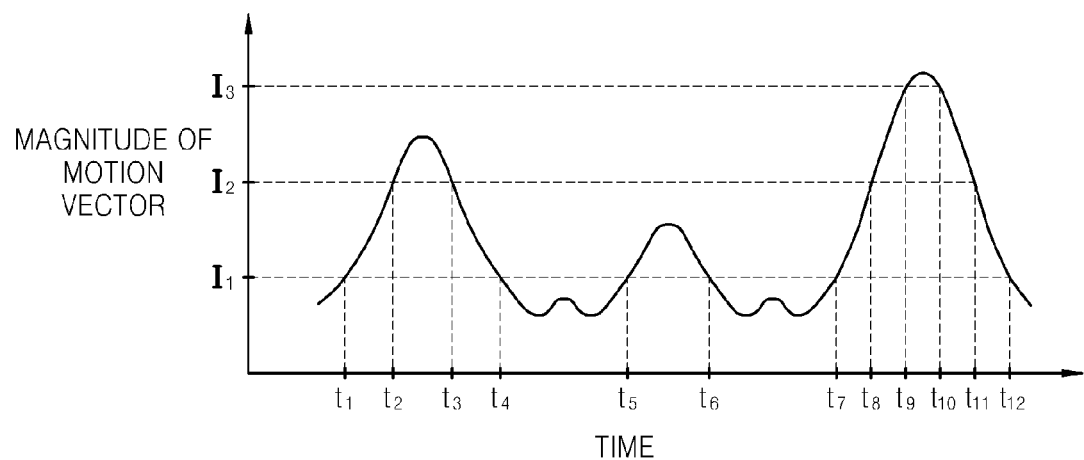
FIG. 7 is a schematic graph of motion vectors' magnitude with respect to time, wherein the magnitude corresponds to motion vectors acquired by a motion vector acquisition unit of the digital moving picture photographing apparatus in FIG. 6.
Figure 8:
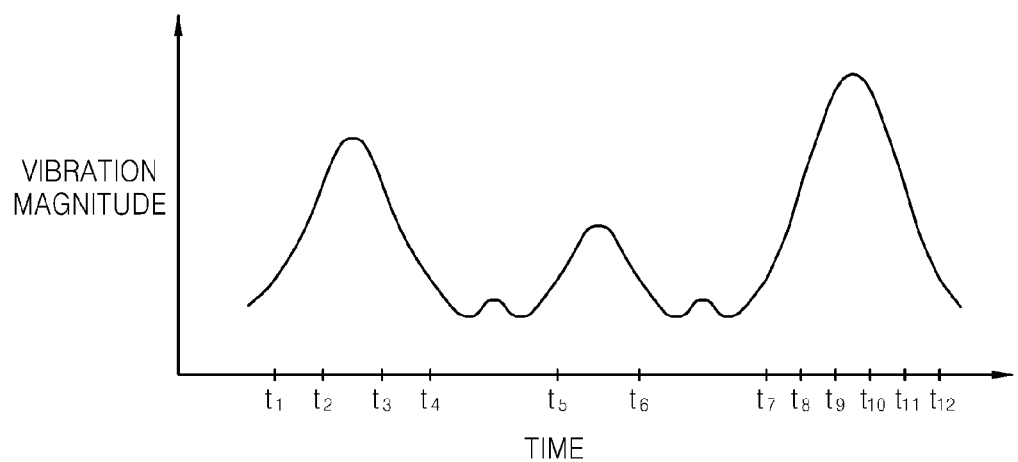
FIG. 8 is a schematic graph of vibration magnitude with respect to time, wherein the vibration magnitude corresponds to vibration data generated by a vibration data generation unit of the digital moving picture photographing apparatus in FIG. 6.

FIG. 7 is a schematic graph of motion vector's magnitude of a with respect to time, wherein the magnitude corresponds to motion vectors acquired by the motion vector acquisition unit 95 of the digital moving picture photographing apparatus of FIG. 6. The magnitude of the motion vector may be determined according to the amount of movement of an object, and may thus vary with time. The vibration data generation unit 93 may generate vibration data based on the motion vector acquired by the motion vector acquisition unit 95. For example, the vibration data generation unit 93 may generate vibration data having a magnitude that varies with time, as shown in FIG. 8. FIG. 8 shows that the vibration data generation unit 93 may generate vibration data having a magnitude corresponding to the magnitude of the motion vector acquired by the motion vector acquisition unit 95. In other words, the vibration data generation unit 93 may generate vibration data having a magnitude that corresponds to the magnitude of the motion vector acquired by the motion vector acquisition unit 95.

The moving picture file stored in the storage medium 70 of the digital moving picture photographing apparatus may further include the vibration data generated by the vibration data generation unit 93, in addition to the image data generated by the image capture device 30, according to a user's selection. In this case, when the moving picture file is reproduced using a digital moving picture processing apparatus including a vibration unit with a vibration function, the vibration unit may induce vibrations according to the vibration data while images from the image data are displayed on the display unit. Thus, the user may feel the vibrations while viewing the images. As a result, unlike when viewing images without any vibrations, the user may experience the moving picture to be more dynamic and engaging. In particular, since the vibration data generation unit 93 may generate vibration data based on the motion vector acquired by the motion vector acquisition unit 95, vibrations may become large when the movement of an object, etc., is large, and may become small when the movement of the object is small, and thus the user may feel vibrations fit to the mood of the moving picture file.

Figure 9:
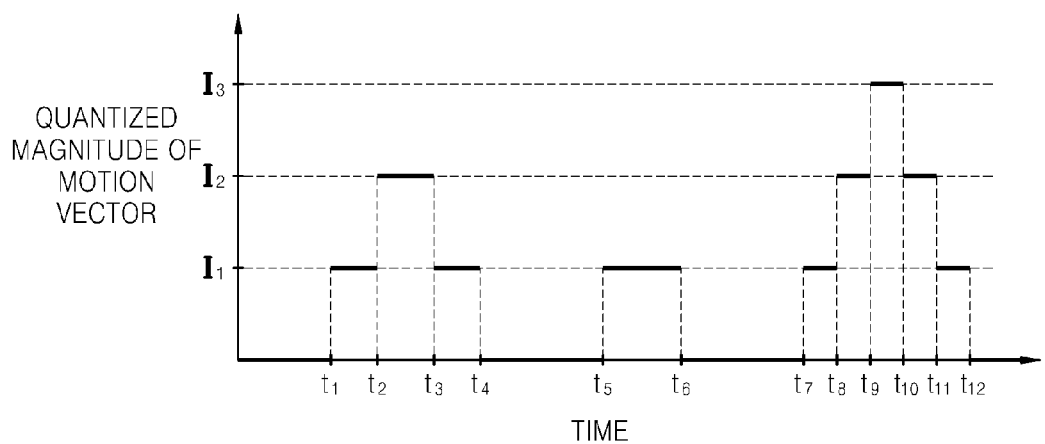
FIG. 9 is a schematic graph of quantized motion vectors' magnitude with respect to time, wherein the quantized motion vectors' magnitude corresponds to motion vectors acquired by the motion vector acquisition unit of the digital moving picture photographing apparatus in FIG. 6.
Figure 10:
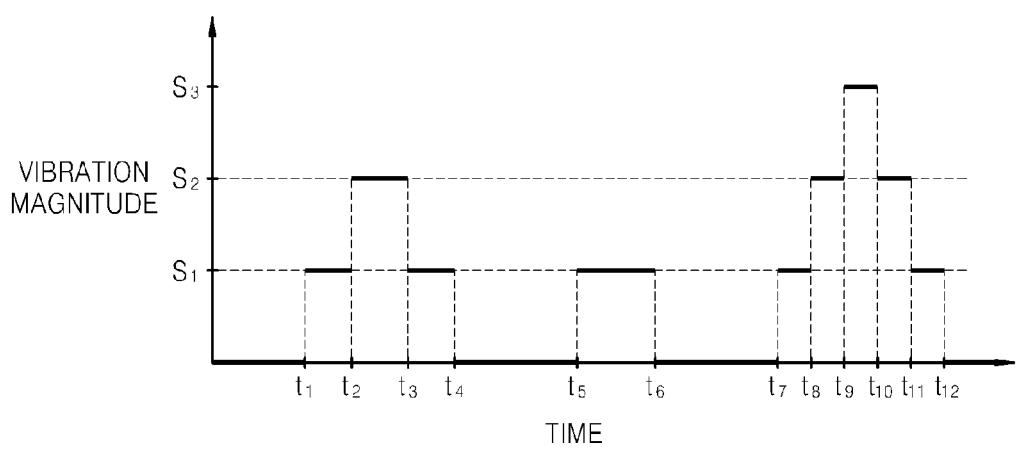
FIG. 10 is a schematic graph of vibration magnitude with respect to time, wherein the vibration magnitude corresponds to vibration data generated by the vibration data generation unit of the digital moving picture photographing apparatus in FIG. 6.

The vibration data generation unit 93 of the digital moving picture photographing apparatus may generate vibration data in a manner different from that described with reference to FIG. 8. For example, when the magnitude of the motion vector varies as shown in FIG. 7, the magnitude of the motion vector may be quantized, as shown in FIG. 9. In other words, referring to FIGS. 7 and 9, the motion vector may be quantized to 0 if the magnitude of the motion vector is smaller than $I_1$, the motion vector may be quantized to $I_1$ if the magnitude of the motion vector is greater than $I_1$ and smaller than $I_2$, the motion vector may be quantized to $I_2$ if the magnitude of the motion vector is greater than $I_2$ and smaller than $I_3$, and the motion vector may be quantized to $I_3$ if the magnitude of the motion vector is greater than $I_3$. Thus, the magnitude of the quantized motion vector may be 0 up to time $t_1$, the magnitude of the quantized motion vector may be $I_1$ between time $t_1$ and time $t_2$, and the magnitude of the quantized motion vector may be $I_2$ between time $t_2$ and time $t_3$. The vibration data generation unit 93 may generate vibration data whose magnitude corresponds to the magnitude of the quantized motion vector of FIG. 9. In other words, the vibration data generation unit 93 may generate vibration data having a magnitude of 0 up to time $t_1$, vibration data having a magnitude of $S_1$ between time $t_1$ and time $t_2$, and vibration data having a magnitude of $S_2$ between time $t_2$ and time $t_3$, as shown in FIG. 10.

When magnitudes of the motion vector are divided into a plurality of magnitude sections, as illustrated in FIG. 9, the vibration data generation unit 93 may generate vibration data having magnitudes that correspond to magnitudes of a magnitude section to which the magnitudes of the motion vector acquired by the motion vector acquisition unit 95 belong. For example, in the case where the vibration data generation unit 93 generates vibration data as shown in FIG. 8 and stores the vibration data along with a moving picture file in the storage medium 70, when the moving picture file is reproduced, the digital moving picture processing apparatus may vibrate constantly at varying magnitudes if an object, etc., in the moving picture file moves. In this case, the constant vibrations may annoy the user. However, in the case where the vibration data generation unit 93 generates vibration data as shown in FIG. 10 and stores the vibration data along with a moving picture file in the storage medium 70, when the moving picture file is reproduced, the digital moving picture processing apparatus may induce vibrations only in a predetermined motion vector's magnitude section (e.g., between $I_1$ and $I_2$), so that the user feels more comfortable compared to when the digital moving picture processing apparatus vibrates constantly.

Although not illustrated, the digital moving picture photographing apparatus in FIG. 6 may further include a vibration unit that vibrates the digital moving picture photographing apparatus in a manner similar to the above-described digital moving picture processing apparatus. Thus, when frame images corresponding to the moving picture file stored in the storage medium 70 are displayed on the display unit 80 of the digital moving picture photographing apparatus, the vibration unit may be controlled to vibrate the digital moving picture photographing apparatus according to the vibration data included in the moving picture file.

Figure 11:
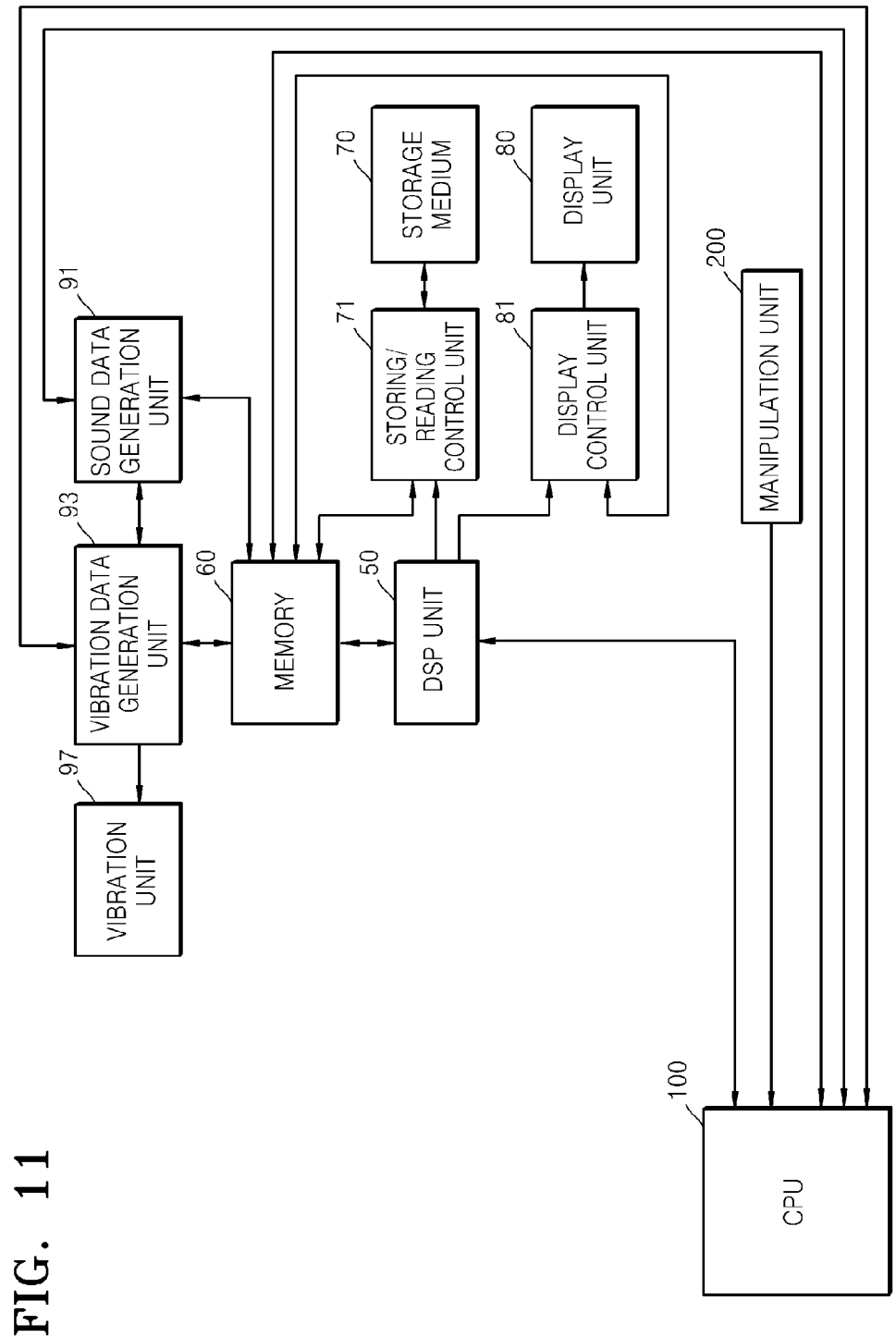
FIG. 11 is a schematic block diagram of an exemplary digital moving picture processing apparatus.

FIG. 11 is a schematic block diagram of an exemplary digital moving picture processing apparatus. The previous embodiments described with reference to FIGS. 1 and 6 relate to a digital moving picture photographing apparatus, whereas the embodiment described with reference to FIG. 11 relates to a digital moving picture processing apparatus. Elements of the digital moving picture processing apparatus illustrated in FIG. 11 that are denoted by the same reference numerals as those in FIGS. 1 and 6 may be similar to the elements in FIGS. 1 and 6, and thus their description will be omitted.

The digital moving picture processing apparatus may display images on the display unit 80 by reproducing a moving picture file stored in the storage medium 70. The moving picture file stored in the storage medium 70 may be modified and then stored again in the storage medium 70. The digital moving picture processing apparatus may further include a vibration unit 97 that induces vibrations having varying magnitudes. The vibration unit 97 may induce vibrations according to the vibration data generated by the vibration data generation unit 93.

When the digital moving picture processing apparatus displays frame images corresponding to the moving picture file on the display unit 80, the vibration unit 97 may induce vibrations having magnitudes corresponding to the intensities of sound data included in the moving picture file, thereby enabling a viewer to enjoy a dynamic, engaging experience while watching the moving picture. In other words, although the moving picture file stored in the storage medium 70 may not include vibration data, in the digital moving picture processing apparatus, the vibration data generation unit 93 may generate vibration data based on the sound data included in the moving picture file so that the vibration unit 97 of the digital moving picture processing apparatus induces vibrations, thereby enabling the viewer to enjoy a dynamic, engaging experience while watching the moving picture.

The vibration unit 97 may induce vibrations having magnitudes according to the sound intensities of the sound data included in the moving picture file, as shown in FIGS. 2 and 3. Alternatively, when the sound intensities are divided into a plurality of sound intensity sections, the vibration unit 97 may induce vibrations having magnitudes that correspond to a sound intensity section to which sounds of the sound data included in the moving picture file belongs, as shown in FIGS. 4 and 5. Further, the vibration unit 97 may induce vibrations in various other manners.

Figure 12:
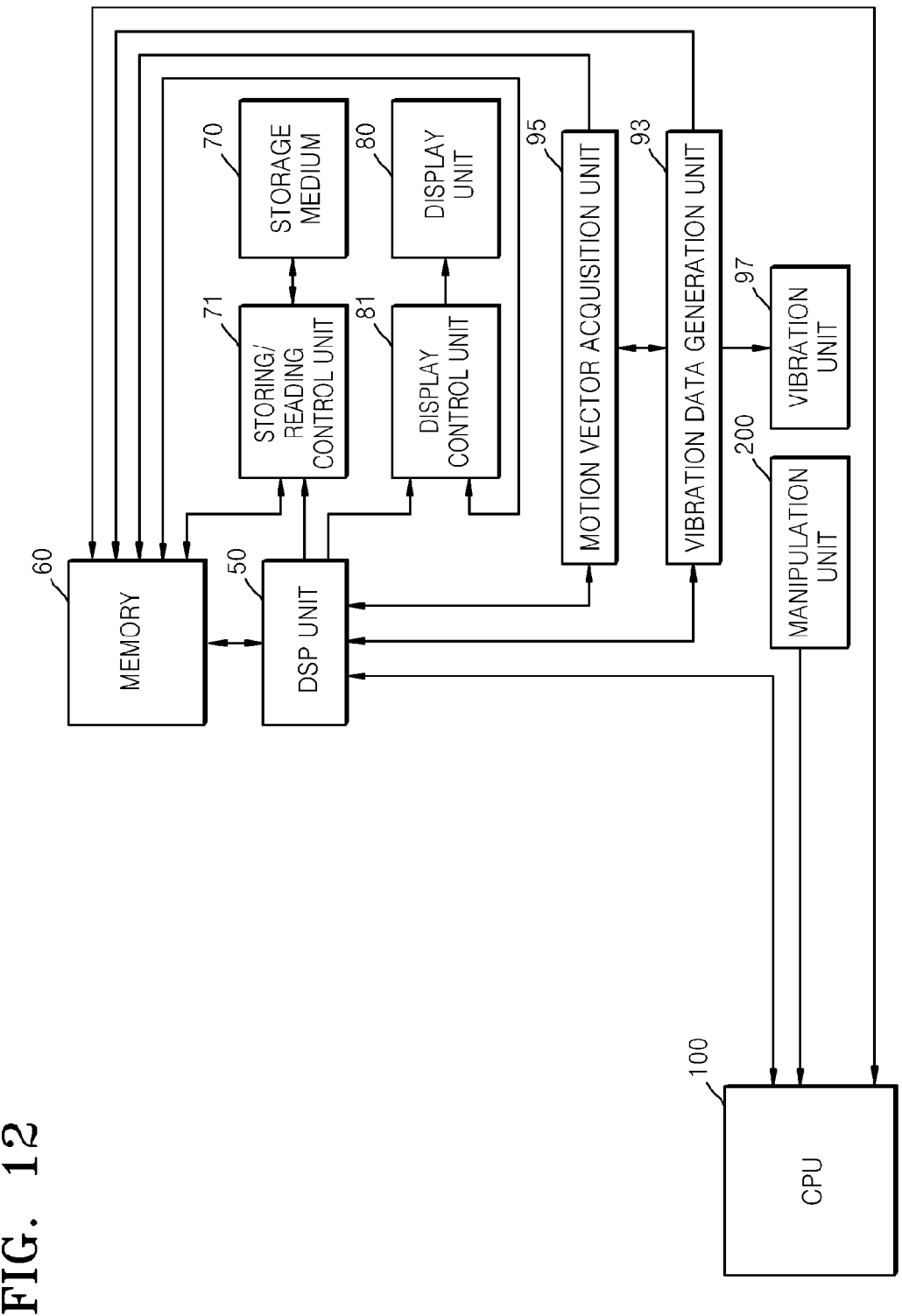
FIG. 12 is a schematic block diagram of another exemplary digital moving picture processing apparatus.

FIG. 12 is a schematic block diagram of another exemplary digital moving picture processing apparatus. The digital moving picture processing apparatus illustrated in FIG. 12 differs from the digital moving picture processing apparatus illustrated in FIG. 11 in the inclusion of a motion vector acquisition unit 95 that acquires a motion vector based on the image data included in the moving picture file stored in the storage medium 70, and in that the vibration data generation unit 93 generates vibration data based on the motion vector acquired by the motion vector acquisition unit 95. In other words, the vibration data generation unit 93 may generate the vibration data based on the motion vector rather than sound data.

A digital moving picture processing apparatuses may have a face recognition function and may further include a function of tracking a target object in an image. Thus, when images from the moving picture file stored in the storage medium 70 are reproduced and then displayed on the display unit 80 using these functions, if a location of a face in a frame varies or a target object moves, the motion vector acquisition unit 95 may acquire a motion vector according to the variation or movement. In other words, the motion vector acquisition unit 95 may acquire a motion vector according to the location of a main object (for example, a face) when an image is displayed on the display unit 80 using the digital moving picture processing apparatus. A magnitude of the motion vector acquired by the motion vector acquisition unit 95 being large may indicate that the movement of the object in the image is large and the image is mostly dynamic. Thus, when the magnitude of the motion vector is large, the vibration data generation unit 93 may generate vibration data based on the motion vector acquired by the motion vector acquisition unit 95. Then, the vibration unit 97 may induce vibrations according to the vibration data.

In the digital moving picture processing apparatus of FIG. 12, the vibration unit 97 may induce vibrations having magnitudes corresponding to magnitudes of the motion vector, as shown in FIGS. 7 and 8. Alternatively, when the magnitudes of the motion vector are divided into a plurality of magnitude sections, the vibration unit 97 may induce vibrations having magnitudes that correspond to a magnitude section to which the magnitudes of the motion vector acquired by the motion vector acquisition unit 95 belong, as shown in FIGS. 9 and 10. Further, the vibration unit 97 may induce vibration in various other manners. As described above, in embodiments of a digital moving picture photographing apparatus and a digital moving picture processing apparatus, vibration data may be generated when shooting a moving picture, and/or vibrations may be induced when displaying the moving picture.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated. It will be recognized that the terms "comprising," "including," and "having," as used herein, are specifically intended to be read as open-ended terms of art.

What is claimed is:

1. A portable digital moving picture photographing apparatus comprising:
   an image capture device that generates image data from incident light;
   a sound data generation unit that generates sound data from incident sound waves;
   a vibration data generation unit that generates vibration data corresponding to the sound data generated by the sound data generation unit, the vibration data being distinct from the sound data, the vibration data generation unit being distinct from the sound data generation unit;

a storage medium that stores a moving picture file including the sound data generated by the sound data generation unit, the vibration data generated by the vibration data generation unit, and the image data generated by the image capture device; and a display unit that displays an image corresponding to the image data generated by the image capture device or frame images corresponding to the moving picture file stored in the storage medium;

wherein, when sound intensities are divided into a plurality of sound intensity sections, the vibration data generation unit generates vibration data having magnitudes that correspond to the sound intensities of a sound intensity section to which sounds corresponding to the sound data generated by the sound data generation unit belong.

2. The portable digital moving picture photographing apparatus of claim 1, further comprising a vibration unit that vibrates the portable digital moving picture photographing apparatus, when the frame images corresponding to the moving picture file stored in the storage medium are displayed on the display unit, the vibration unit vibrates the digital moving picture photographing apparatus according to the vibration data included in the moving picture file.

3. The portable digital moving picture photographing apparatus of claim 1, wherein the vibration data generation unit generates vibration data having magnitudes corresponding to sound intensities of the sound data generated by the sound data generation unit.

4. A portable digital moving picture photographing apparatus comprising:

an image capture device that generates image data from incident light;

a motion vector acquisition unit that acquires a motion vector based on the image data generated by the image capture device;

a vibration data generation unit that generates vibration data based on the motion vector acquired by the motion vector acquisition unit;

a storage medium that stores a moving picture file including the image data generated by the image capture device and the vibration data generated by the vibration data generation unit; and a display unit that displays an image corresponding to the image data generated by the image capture device or frame images corresponding to the moving picture file stored in the storage medium;

wherein, when magnitudes of the motion vector are divided into a plurality of magnitude sections, the vibration data generation unit generates vibration data having magnitudes that correspond to magnitudes of a magnitude section to which the magnitudes of the motion vector acquired by the motion vector acquisition unit belong.

5. The portable digital moving picture photographing apparatus of claim 4, further comprising a vibration unit that vibrates the digital moving picture photographing apparatus, wherein, when the frame images corresponding to the moving picture file stored in the storage medium are displayed on the display unit, the vibration unit vibrates the digital moving picture photographing apparatus according to the vibration data included in the moving picture file.

6. The portable digital moving picture photographing apparatus of claim 4, wherein the vibration data generation unit generates vibration data having a magnitude corresponding to a magnitude of the motion vector acquired by the motion vector acquisition unit.

7. The portable digital moving picture photographing apparatus of claim 4, wherein the motion vector acquisition unit acquires the motion vector according to a location of a main object during shooting using the digital moving picture photographing apparatus.

8. The portable digital moving picture photographing apparatus of claim 4, wherein the motion vector acquisition unit acquires the motion vector according to a location of a target part of an object to be auto-focused during shooting using the digital moving picture photographing apparatus.

9. A portable digital moving picture processing apparatus comprising:

a storage medium that stores a moving picture file;

a display unit that displays frame images corresponding to the moving picture file stored in the storage medium; and a vibration unit that induces vibrations having varying magnitudes, the vibrations vibrating the portable digital moving picture processing apparatus, wherein, when the frame images corresponding to the moving picture file stored in the storage medium are displayed on the display unit, the vibration unit induces vibrations having magnitudes that correspond to at least one of sound or motion of the moving picture file, wherein the vibration unit induces vibrations that correspond to sound data included in the moving picture file, wherein, when sound intensities of the sound data included in the moving picture file are divided into a plurality of sound intensity sections, the vibration unit induces vibrations having magnitudes that correspond to a sound intensity section to which sounds of the sound data belong.

10. The portable digital moving picture processing apparatus of claim 9, wherein the vibration unit induces vibrations having magnitudes that correspond to sound intensities of the sound data included in the moving picture file.

11. The portable digital moving picture processing apparatus of claim 9, wherein the vibration unit induces vibrations according to vibration data included in the moving picture file.

12. A portable digital moving picture processing apparatus comprising:

a storage medium that stores a moving picture file;

a motion vector acquisition unit that acquires a motion vector based on image data included in the moving picture file;

a display unit that displays frame images corresponding to the image data included in the moving picture file stored in the storage medium; and a vibration unit that induces vibrations having varying magnitudes, the vibrations vibrating the portable digital moving picture processing apparatus, wherein, when the frame images are displayed on the display unit, the vibration unit induces vibrations having magnitudes that correspond to magnitudes of the motion vector acquired by the motion vector acquisition unit;

wherein, when magnitudes of the motion vector are divided into a plurality of magnitude sections, the vibration unit induces vibrations having magnitudes that correspond to a magnitude section to which the magnitudes of the motion vector acquired by the motion vector acquisition unit belong; and wherein the motion vector acquisition unit acquires the motion vector according to a location of a main object.

13. The portable digital moving picture processing apparatus of claim 12, wherein the vibration unit induces vibrations having magnitudes that correspond to magnitudes of the motion vector acquired by the motion vector acquisition unit.

* * * * *